United States Patent
Thacker et al.

(10) Patent No.: US 7,033,496 B2
(45) Date of Patent: Apr. 25, 2006

(54) WATER CLARIFICATION SYSTEM WITH WEIR

(75) Inventors: Kris Odell Thacker, Rawson, OH (US); Bill Russell Vanhoose, Findlay, OH (US); Howard Leander Montgomery, Findlay, OH (US)

(73) Assignee: Hancor, Inc., Findlay, OH (US)

( * ) Notice: Subject to any disclaimer, the term of this patent is extended or adjusted under 35 U.S.C. 154(b) by 0 days.

(21) Appl. No.: 11/038,885

(22) Filed: Jan. 20, 2005

(65) Prior Publication Data

US 2005/0126988 A1    Jun. 16, 2005

Related U.S. Application Data

(62) Division of application No. 10/614,156, filed on Jul. 7, 2003, now Pat. No. 6,907,997.

(60) Provisional application No. 60/448,326, filed on Feb. 19, 2003.

(51) Int. Cl.
*B01D 21/02* (2006.01)

(52) U.S. Cl. .................. 210/305; 210/521; 210/532.1; 210/538

(58) Field of Classification Search ................ 210/519, 210/521, 532.1, 538, 540, 513, 299, 305
See application file for complete search history.

(56) References Cited

U.S. PATENT DOCUMENTS

| 1,902,171 | A | * | 3/1933 | Kopp ........................ 210/538 |
| 2,573,615 | A | | 10/1951 | Seailles |
| 3,837,501 | A | | 9/1974 | Pielkenrood |
| 3,844,743 | A | | 10/1974 | Jones |
| 3,849,311 | A | | 11/1974 | Jakubek |
| 3,933,654 | A | | 1/1976 | Middelbeek |
| 4,042,512 | A | | 8/1977 | McCarthy et al. |
| 4,059,511 | A | | 11/1977 | Musha et al. |
| 4,064,054 | A | * | 12/1977 | Anderson et al. ........... 210/521 |
| 4,067,813 | A | | 1/1978 | Pielkenrood |
| 4,123,365 | A | | 10/1978 | Middelbeek |
| 4,132,651 | A | | 1/1979 | deJong |
| 4,157,969 | A | * | 6/1979 | Thies ........................ 210/521 |
| 4,273,654 | A | | 6/1981 | Pielkenrood |
| 4,400,274 | A | | 8/1983 | Protos |

(Continued)

FOREIGN PATENT DOCUMENTS

FR    1098155    7/1955

(Continued)

OTHER PUBLICATIONS

Report entitled "Product Note 3.140" by Patrick Collings, Advanced Drainage Systems, Inc., Feb. 2002, 6 pages.

(Continued)

*Primary Examiner*—Christopher Upton
(74) *Attorney, Agent, or Firm*—R. D. Johnson & Associates, P.C.

(57) ABSTRACT

A casing surrounds a horizontal axis to define a cavity. The cavity has a top, a bottom, and axially front and rear ends. The casing is configured to conduct a mixture of a liquid and debris through the cavity from the front end to the rear end. Front and rear walls cap the casing at the front and rear ends. A horizontal outlet tube extends through the rear wall and defines a horizontal outlet channel with a bottom. A transversely-extending weir extends upward from the bottom of the cavity. The weir has a horizontal top edge located above the channel bottom and spaced below the top of the cavity, and further has fluid flow apertures below the channel bottom.

14 Claims, 4 Drawing Sheets

U.S. PATENT DOCUMENTS

| | | | |
|---|---|---|---|
| 4,437,988 | A | 3/1984 | James |
| 4,722,800 | A | 2/1988 | Aymong |
| 4,797,210 | A | 1/1989 | Lonardo |
| 4,859,329 | A | 8/1989 | Fink |
| 4,869,831 | A | 9/1989 | Hinkle, II |
| 4,897,206 | A | 1/1990 | Castelli |
| 5,004,537 | A * | 4/1991 | Brown ........................ 210/521 |
| 5,028,333 | A | 7/1991 | Wright et al. |
| 5,173,195 | A | 12/1992 | Wright et al. |
| 5,207,895 | A | 5/1993 | Basseen et al. |
| 5,229,015 | A | 7/1993 | Keep et al. |
| 5,242,604 | A | 9/1993 | Young et al. |
| 5,246,592 | A | 9/1993 | Schweizer et al. |
| 5,266,191 | A | 11/1993 | Greene et al. |
| 5,433,845 | A | 7/1995 | Greene et al. |
| 5,500,132 | A | 3/1996 | Elmi |
| 5,505,860 | A * | 4/1996 | Sager ......................... 210/538 |
| 5,520,825 | A | 5/1996 | Rice |
| 5,545,327 | A | 8/1996 | Volland |
| 5,547,569 | A | 8/1996 | Spencer |
| 5,554,301 | A | 9/1996 | Rippetoe et al. |
| 5,730,872 | A | 3/1998 | Rhodes |
| 5,746,912 | A * | 5/1998 | Monteith ................. 210/532.1 |
| 5,759,415 | A | 6/1998 | Adams |
| 5,874,008 | A | 2/1999 | Hirs |
| 5,989,415 | A | 11/1999 | Hirs |
| 5,993,646 | A * | 11/1999 | Powers ........................ 210/538 |
| 6,056,128 | A | 5/2000 | Glasgow |
| 6,077,448 | A | 6/2000 | Tran-Quoc-Nam et al. |
| 6,079,571 | A | 6/2000 | Stowell |
| 6,126,817 | A | 10/2000 | Duran et al. |
| 6,177,004 | B1 | 1/2001 | Bracone, Jr. |
| 6,200,490 | B1 | 3/2001 | Hirs |
| 6,350,374 | B1 | 2/2002 | Stever et al. |
| 6,524,473 | B1 | 2/2003 | Williamson |
| 6,605,224 | B1 | 8/2003 | Aymong |
| 6,783,683 | B1 | 8/2004 | Collings |
| 6,797,161 | B1 * | 9/2004 | Use et al. ................. 210/532.1 |
| 2001/0013489 | A1 | 8/2001 | Williamson |

FOREIGN PATENT DOCUMENTS

| | | |
|---|---|---|
| US | 0019821 | 1/2003 |

OTHER PUBLICATIONS

Brochure entitled "Ecosep Oil and Water Separator" by Royal Environmental Systems, Inc., undated, 4 pages.

Brochure entitled "Oil-Water Separators" by Oldcastle Precast Group, undated, 6 pages.

Brochure entitled "Fiberglass Underground Oil/Water Separators" by Xerxes Corp., 2001, 10 pages.

Brochure entitled "Oil/Water Separator Tanks" by Mohawk Metal Products, undated, 8 pages.

Brochure entitled "The Stormwater Management StormFilter" by Stormwater Management Inc., undated, 9 pages.

Brochure entitled "GDS Gravity Differential Separator" by Loveless Mfg., undated, 4 pages.

Brochure entitled "Oil Water Separators" by McTighe Industries Inc., undated, 6 pages.

Design Manual entitled "Purisep Separators" by Purification International, Inc., 1989, 3 pages.

"BaySaver Separation System Technical and Design Manual" by BaySaver, Inc., Oct. 2002, title page and pp. i-ii and 1-35.

Webpage entitled "Jaeger Tri-Packs" at http://www.jaeger.com/tripack.htm, rev. 2001.

* cited by examiner

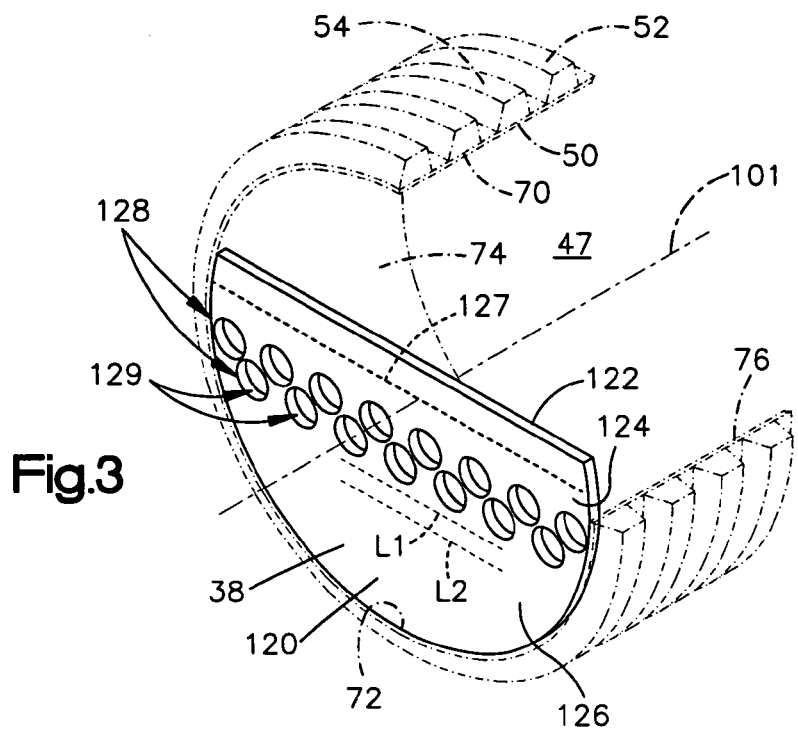
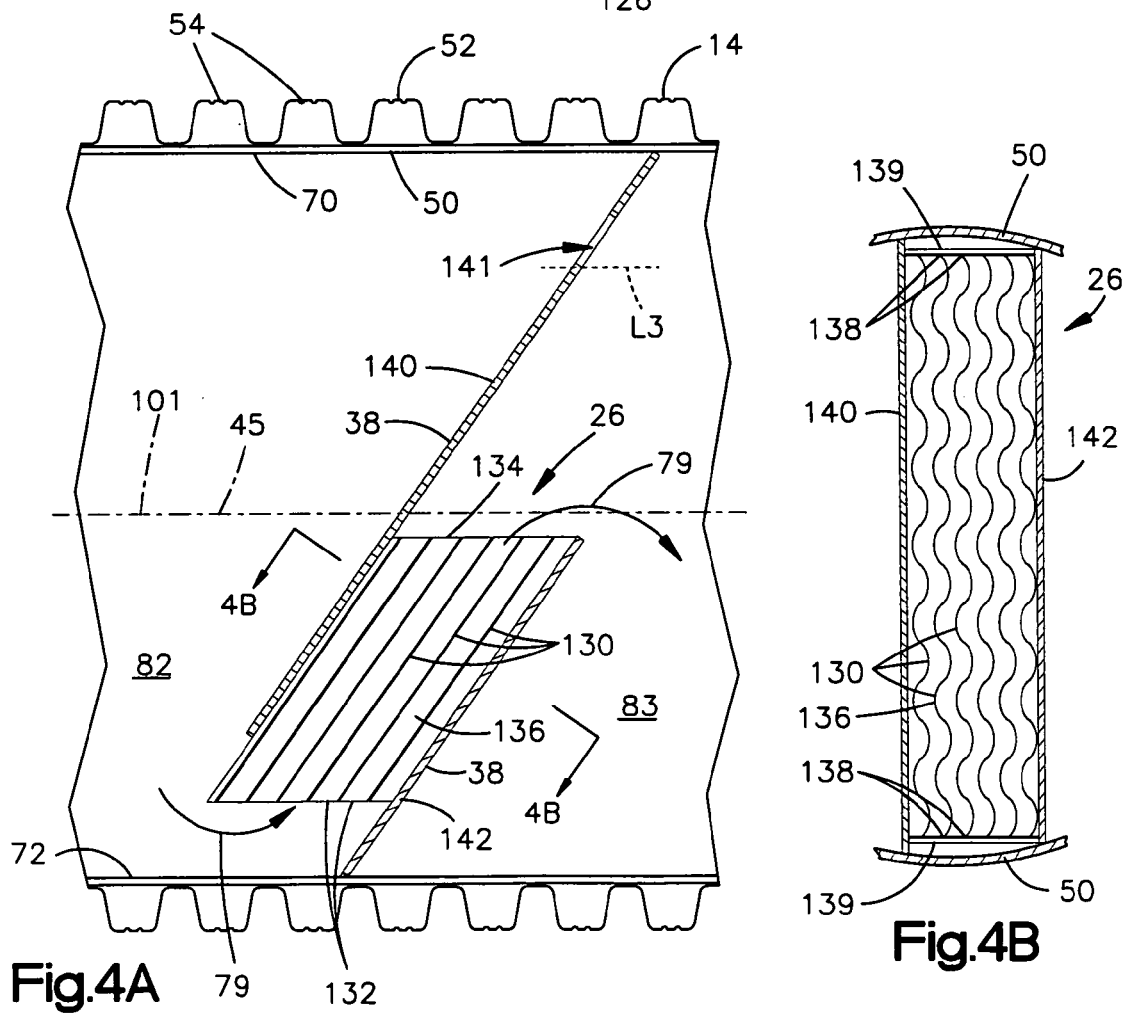

WATER CLARIFICATION SYSTEM WITH WEIR

CROSS-REFERENCE TO RELATED APPLICATIONS

This application is a division of U.S. application Ser. No. 10/614,156, filed Jul. 7, 2003 now U.S. Pat. No. 6,907,997, incorporated herein by reference, which claims the benefit of U.S. Provisional Application No. 60/448,326, filed Feb. 19, 2003.

TECHNICAL FIELD

The present invention relates to water clarification and oil-water separators.

BACKGROUND

A water clarification system can be an oil-water separator used to separate contaminants from water. The water is typically rain runoff from a parking lot. The contaminants are typically oil, sludge and gravel. The separator may be buried in the ground. In operation, a mixture of the water and the contaminants enters the separator. The water exits the separator, while the contaminants are retained by and in the separator. The contaminants may be manually removed from the separator by way of manholes located along the top of the separator.

SUMMARY

An apparatus comprises a casing surrounding a horizontal axis to define a cavity. The cavity has a top, a bottom, and axially front and rear ends. The casing is configured to conduct a mixture of a liquid and debris through the cavity from the front end to the rear end. Front and rear walls cap the casing at the front and rear ends. A horizontal outlet tube extends through the rear wall and defines a horizontal outlet channel with a bottom. A transversely-extending weir extends upward from the bottom of the cavity. The weir has a horizontal top edge located above the channel bottom and spaced below the top of the cavity, and further has fluid flow apertures below the channel bottom.

Preferably, the apertures are arranged in horizontal mutually-overlapping rows, with the apertures of one row being separated from each other and horizontally offset from the adjacent apertures of another row. A vertical outlet tube in the cavity has an intake opening below the bottom of the horizontal outlet channel and defines a vertical outlet channel. The vertical outlet channel extends downward from the horizontal outlet channel to the intake opening.

BRIEF DESCRIPTION OF THE DRAWINGS

FIG. 3 is a perspective view of a part shown in FIG. 1;

FIG. 4A is a sectional view of other parts shown in FIG. 1;

FIG. 4B is a sectional view taken at line 4B—4B of FIG. 4A;

DESCRIPTION

Figure 1:
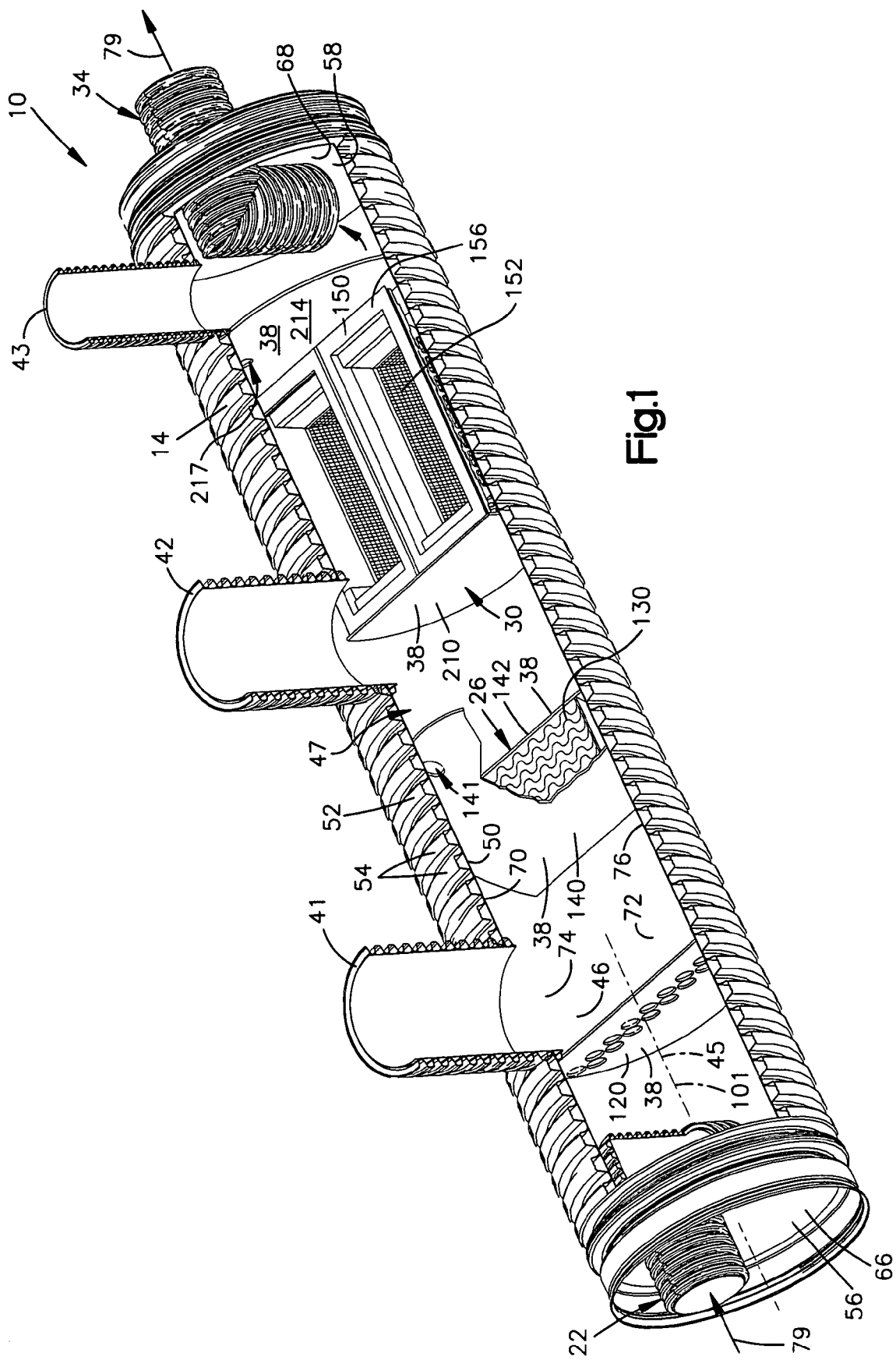
FIG. 1 is a perspective view of an embodiment of the present invention.

The apparatus 10 shown in FIG. 1 has parts which, as described below, are examples of the elements recited in the claims.

The apparatus 10 is a water-contaminant separator. The separator 10 is used to separate contaminants from a liquid. In this example, the liquid is water, such as rain runoff from a parking lot. The contaminants can be buoyant, such as oil and styrofoam debris, or sedimentary, such as sludge and gravel. The separator 10 includes a cylindrical casing 14. In operation, a mixture of the water and the contaminants enters the casing 14 through an inlet structure 22. The contaminants are initially either floating at the top of the water, settled at the bottom, or suspended in-between. A plate coalescer 26 and a media coalecser 30 within the casing 14 promote floating of the initially-suspended buoyant contaminants and settling of the initially-suspended sedimentary contaminants. As the water exits the tank structure 14 through an outlet structure 34, baffles 38 of various types within the casing 14 retain the floating and settled contaminants in the casing 14. The contaminants may be manually removed from the casing 14 through manways 41, 42 and 43 located along the top of the chamber 14.

Figure 2:
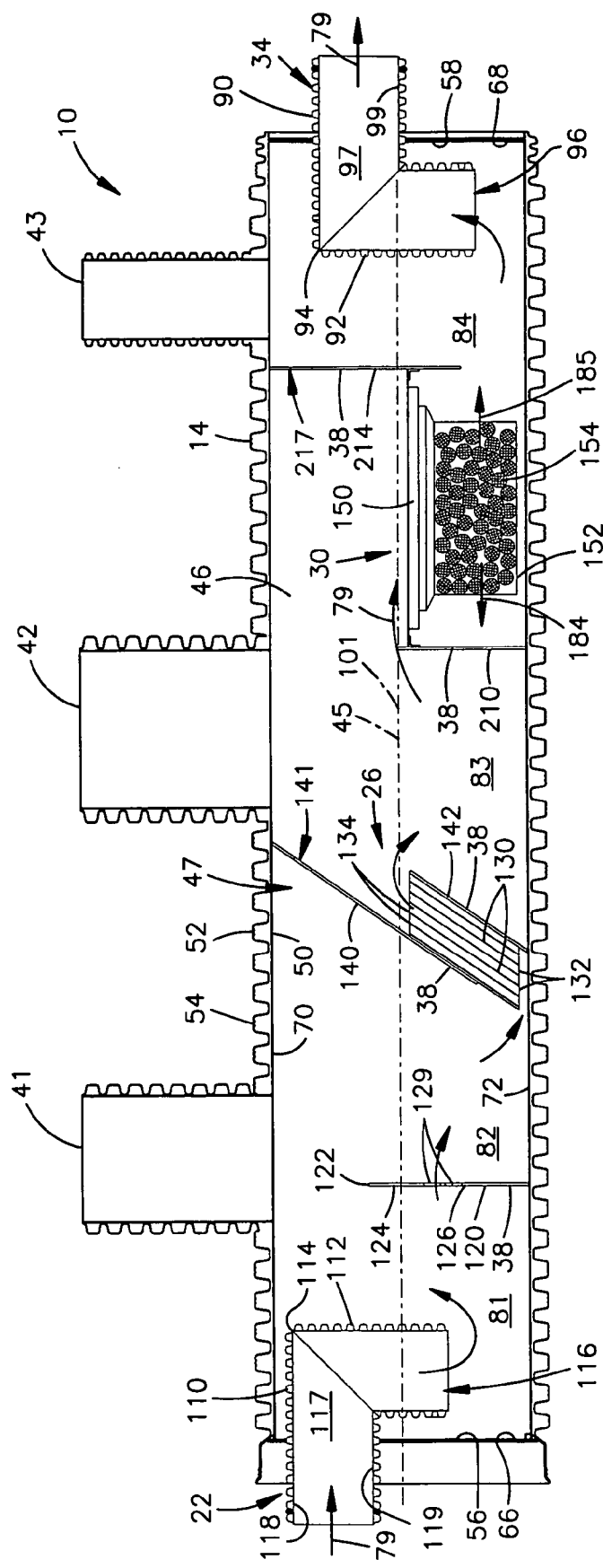
FIG. 2 is a side sectional view of the embodiment of FIG. 1.

The separator 10 is configured to operate in an installed orientation shown in FIG. 2, typically buried in the ground. The various features of the separator 10 are described as follows with reference to the installed orientation.

The cylindrical casing 14 is centered on a horizontal axis 45. The casing 14 has an inner surface 46 that surrounds the axis 45 to define a cavity 47. In this example, the casing 14 comprises a cylindrical inner liner 50 surrounded by a corrugated wall 52 with circumferentially-extending corrugations 54. The inner liner 50 defines the inner surface 46 of the casing 14. Front and rear walls 56 and 58 cap the casing 14 at axially front and rear ends 66 and 68 of the cavity 47.

The cavity 47 has a top 70, a bottom 72 and two opposite sides 74 and 76. As indicated by arrows 79, the chamber 14 is configured to conduct the mixture of the water and the contaminants rearward through the cavity 47 from the inlet structure 22 to the outlet structure 34.

The cavity 47 is divided by the baffles 38 into first, second, third and fourth compartments 81, 82, 83 and 84, as shown in FIG. 2. In each compartment 81, 82, 83 and 84, a portion of the initially-suspended contaminants rises upward or settles downward. The resulting floating and settled contaminants are inhibited by the baffles 38 from progressing along with water from one compartment 81, 82, 83 and 84 to the next.

The outlet structure 34 comprises a horizontal tube 90 and a vertical tube 92 joined at an elbow junction 94. The vertical tube 92 has an intake opening 96 within the fourth compartment 84. The vertical tube 92 extends from the intake opening 96 upward to the junction 94. The horizontal tube 90, in turn, extends from the junction 94 axially rearward through the rear wall 58.

The horizontal tube 90 has a horizontal channel 97. A bottom 99 of the horizontal channel 97 defines a nominal water line 101 within the cavity 47. The nominal water line 101 corresponds to the surface of the water in a normal flow condition of the separator 10. In this example, the nominal water line 101 coincides with the central axis 45 of the casing 14. The intake opening 96 is located midway between the nominal water line 101 and the bottom 72 of the cavity 47. This helps prevent both the floating and settled contaminants from exiting the cavity 47 through the intake opening 96.

Like the outlet structure 34, the inlet structure 22 comprises a horizontal tube 110 and a vertical tube 112 joined at an elbow junction 114. The horizontal tube 110 of the inlet structure 22 extends axially rearward through the front wall 56 to the elbow junction 114 within the first chamber 81. The vertical tube 112 extends downward from the junction 114 and has a discharge opening 116 within the first compartment 81.

The horizontal tube 110 has a horizontal inlet channel 117 through which water flows rearward toward the junction 114. The horizontal inlet channel 117 has a top 118 and a bottom 119, both located above the nominal water line 101. This impedes the water from draining out of the cavity 47 by way of the inlet structure 22.

The discharge opening 116 of the inlet structure 22 is submerged below the nominal water line 101. Accordingly, the water spilling down from the horizontal inlet channel 117 hits the nominal water lines 101 inside the vertical inlet tube 112. Most of the resulting turbulence is thus confined to within the vertical tube 112, which reduces turbulence elsewhere within the cavity 47. This is beneficial, because turbulence detrimentally impedes rising and settling of the contaminants.

One of the baffles 38 is a transversely-extending (with respect to the axis 45) perforated weir 120. The weir 120 is located rearward of the inlet structure 22 and separates the first compartment 81 from the second compartment 82. As shown in FIG. 3, the weir 120 extends from the bottom 72 of the cavity 47 up to a horizontal top edge 122 of the weir 120. The top edge 122 extends transversely and horizontally from one side 74 of the casing 14 to the other side 76. The weir 120 thus defines a barrier to water flow bounded by the top edge 122 and the casing 14.

The top edge 122 of the weir 120 is located above the nominal water line, indicated in FIG. 3 axially by the dashed line 101 and transversely by dashed line 127. This prevents the mixture from floating over, and thus bypassing, the weir 120 under normal flow conditions. However, the top edge 122 is spaced below the top 70 of the cavity 47, and, preferably, even lower than the top 118 of the horizontal inlet channel 117 (FIG. 2). This provides an open section between the top edge 122 of the weir 120 and the top 70 of the cavity 47 through which the water can quickly flow, and bypass the weir 120, during abnormally high flow conditions.

The weir 120 consists of a perforated upper section 124 and a non-perforated lower section 126. The perforated upper section 124 has two horizontal rows 128 of holes 129 located below the nominal water line 101. The rows 128 are vertically overlapping. The holes 129 are separated from each other, with the holes 129 of one row 128 horizontally offset from adjacent holes 129 of the other row 129. Accordingly, the holes 129 of one row 128 are interleaved with, and staggered relative to, the holes 129 of the other row 128. This enables compact packing of the holes 129. The holes 129 are fluid flow apertures configured to pass water but not debris larger than the holes 129. The perforated upper section 124 thus filters out larger contaminants from the water to retain them in the first compartment 81, shown in FIG. 2.

The lower section 126 is non-perforated to prevent even small sediment from passing from the first compartment 81 to the second compartment 82. To this end, the weir 120 is free of fluid flow apertures 129 below a first level L1 located vertically halfway between the bottom 72 of the cavity 47 and the top edge 122. The weir 120 is also free of fluid flow apertures 129 below a second level L2 vertically halfway between the bottom 72 of the cavity 47 and the nominal water line 127.

The plate coalescer 26, as shown in FIG. 2, is located rearward of the weir 120 between the second and third compartments 82 and 83. As shown in FIGS. 4A and 4B, the plate coalescer 26 comprises an inclined stack of corrugated plates 130. Each plate 130 extends from a bottom edge 132 of the plate 130 rearward and upward to a top edge 134 of the plate 130. The bottom edge 132 is spaced from the bottom 72 of the cavity 47, and the top edge 134 is located below the nominal water line 101. This configuration enables the water to enter the coalescer 26 from below, to flow rearward and rearward in-between the plates 130, and to exit the coalescer 26 from above.

Each plate 130 is corrugated, with corrugations 136 extending rearward and upward fully from the bottom edge 132 to the top edge 134. The corrugations 136 are thus aligned along the direction of the water flow between the plates 130, as indicated by the arrows 79. As shown in FIG. 4B, each corrugation 136 of each plate 130 is positioned directly above a corrugation 136 of the plate 130 just below it. Each plate 130 has two opposite side edges 138 received in respective grooves (not shown) in two opposite plate retainers 139.

Flow of the mixture rearwardly upward in-between the plates 130 shown in FIG. 4A promotes coalescing of the initially-suspended particles and droplets into agglomerates. Relative to the suspended particles and droplets, the agglomerates have more buoyancy for floating upward or more weight for settling downward. The floating agglomerates can flow out the top of the coalescer 26 into the third compartment 83 where they can float at the water surface 101. Similarly, the sedimentary agglomerates can be swept by the water out the top of the coalescer 26 and settle as sediment at the bottom of the third compartment 83. Alternatively, the sedimentary agglomerates can slide down the plates 130 to settle as sediment at the bottom 72 of the second compartment 82.

An upper coalescer baffle 140, which is one of the baffles 38 mentioned above, extends from a front one of the coalescer plates 130 upward to the casing 14. The upper coalescer baffle 140 prevents any floating contaminants in the second compartment 82 from migrating to the third compartment 83. The upper coalescer baffle 140 also prevents the mixture from flowing rearwardly over, and thus bypassing, the coalescer 26 under normal flow conditions when the water is below a predetermined level L3. A bypass flow opening 141 in the upper baffle 140 allows the mixture to bypass the plate coalescer 26 under high flow conditions when the water rises above the predetermined level L3.

A lower coalescer baffle 142 extends from a rear one of the plates 130 downward to the casing 14. The lower coalescer baffle 142 prevents the water from flowing rearwardly under, and thus bypassing, the coalescer 26. The lower coalescer baffle 142 also prevents any sediment in the second compartment 82 from migrating to the third compartment 83. In this manner, the lower baffle 142, along with the upper baffle 140 and the plates 130, separates the second compartment 82 from the third compartment 83.

Figure 5:
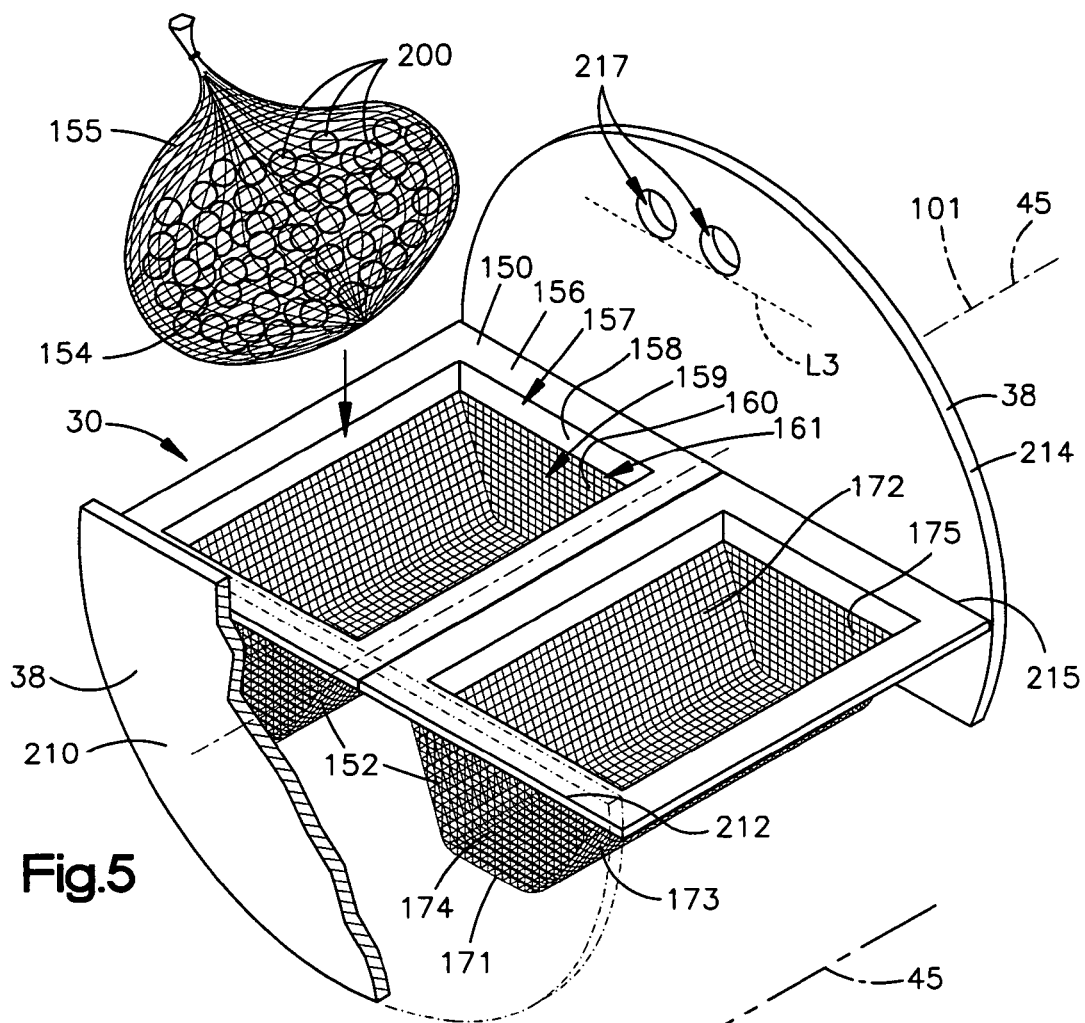
FIG. 5 is a perspective view of yet other parts shown in FIG. 1.

The media coalecser 30, as shown in FIG. 2, is located rearward of the coalescer 26, in front of the outlet structure 34, and between the third and fourth compartments 83 and 84. As shown in FIG. 5, the media coalecser 30 comprises a frame 150, two porous baskets 152, and coalescing media 154. When in use, the media 154 is contained in the baskets 152.

A porous bag 155 is used to contain the media 154 during transport to and from each basket 152. To fill the basket 152, the media 154 is first transported to the basket 152 while encased in the porous bag 155. The media 154 is placed in the basket 152 along with the bag 155 and remains encased in the bag 155 while in use. While in use, the bag 155 prevents the water from sweeping the media 154 out of the basket 152. The media 154 is removed from the basket 152 by simply lifting the bag 155 out of the basket 152.

The frame 150 is located below the nominal water line 101. The frame 150 comprises a nonporous plate 156 extending horizontally from one side 74 (FIG. 1) of the casing 14 to the other side 76. The plate 156 has two side-by-side rectangular openings 157. From the two openings 157, two nonporous rectangular tubes 158 extend downward to two bottom openings 159.

Figure 6:
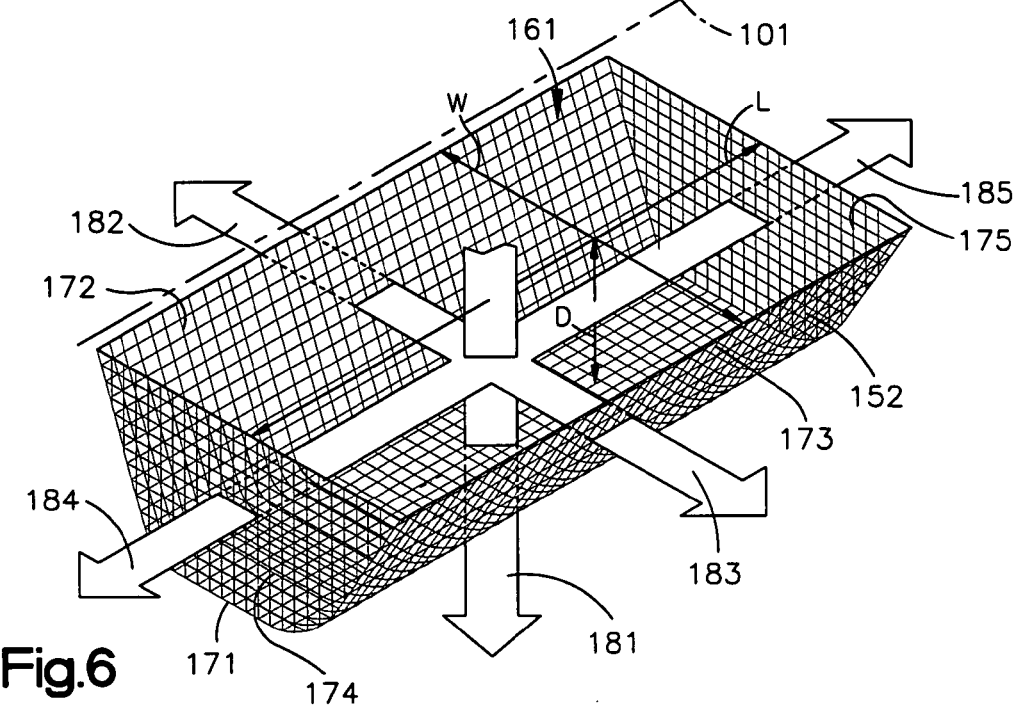
FIG. 6 is a perspective view of a part shown in FIG. 5.

The two porous baskets 152 hang down from the two tubes 158. Each basket 152 consists of a screen 160 extending downward from a top opening 161 of the basket 152. This top opening 161 coincides with the bottom opening 159 of the respective tube 158. The screen 160 passes the water while retaining the coalescing media 154. As shown in FIG. 6, the basket 152 is trough-shaped, with a porous bottom wall 171, porous opposite side walls 172 and 173, and porous front and rear walls 174 and 175.

The water flows by force of gravity into the basket 152 vertically downward through the top opening 161, as shown in FIG. 6. The water then flows through the coalescing media 154 (FIG. 5) in the basket 52. The water flows, further, out of the basket 152 in several directions. Specifically, the water can flow downward through the bottom wall 171. This flow is in a first direction 181 extending vertically downward through the top opening 161, perpendicular to the axis 45 of the casing 14 (FIG. 2). The water can flow out of the basket 152 also through the side walls 172 and 173. These flows are in horizontal second and third directions 182 and 183 that are opposite each other, perpendicular to the first direction 181 and perpendicular to axis 45 of the casing 14. The water can flow out of the basket 152 also through the front and rear walls 174 and 175. These flows are in a horizontal frontward fourth direction 184 and a horizontal rearward fifth direction 185. These directions 184 and 185 are opposite each other, perpendicular to the first, second and third directions 181, 182 and 183, and parallel with the axis 45 of the casing 14. So as not to obstruct the water outflow in these directions 181, 182, 183, 184 and 185, the porous walls 171, 172, 173, 174 and 175 are all spaced from the casing 14.

Accordingly, the water can flow outward through of the basket 152 in multiple, mutually opposite or perpendicular, directions 181, 182, 183, 184 and 185, and those directions 181, 182, 183, 184 and 185 include both vertical and horizontal directions. These features beneficially decrease resistance to water flow. They also improve coalescing efficacy by reducing turbulence. For this purpose, a depth D of the basket 152 is preferably at least as large as the narrowest width W of the top opening 161. Additionally, the porous wall 160 extends downward sufficiently such that the surface area of the porous wall 160 is at least double the area encircled by the top opening 161. In this example, the area encircled by the top opening 161 equals the length L of the opening 161 times the width W of the opening 161.

The coalescing media 154 in this example, shown schematically in FIG. 5, is in the form of balls 200 known in the art. Examples of such balls 200 are Jaeger Tri-Packs® sold by Jaeger Products, Inc. of Houston, Tex. Each ball 200 comprises a network of plastic ribs (not shown). The network of ribs promotes coalescing of the initially-suspended particles and droplets into agglomerates that have sufficient buoyancy to float upward or sufficient weight to settle downward. Alternatively, the agglomerates can have sufficient size and adhesion to be caught or adhered by the rib network itself. When the balls 200 are first piled into the basket 152, each ball 200 can roll about the pile due to its round shape, until pile is compactly packed. The media 154 fills each basket 152 and extends upward into each tube 158. This ensures that the water flowing into the basket 152 through the top opening 161 and outward through the basket 152 must flow through the media 154.

A lower media coalecser baffle 210, shown in FIGS. 2 and 5, is one of the baffles 38 mentioned above. It is located in front of the basket 152 and extends vertically from a front end 212 of the frame 150 downward to the casing 14. The lower baffle 210 also extends upward from the front end 212 almost to the nominal water line 101. The lower media coalecser baffle 210 prevents the mixture from bypassing the top opening 161 from the side or from below. The lower media coalecser baffle 210 also prevents sediment in the third compartment 83 from migrating to the fourth compartment 84.

An upper media coalecser baffle 214 is located rearward of the basket 152 and extends vertically from a rear end 215 of the plate 156 upward to the casing 14. The upper baffle 214 also extends downward from the rear end 215 of the plate 156 without reaching the bottom 72 of the cavity 47. The upper baffle 214 prevents floating contaminants in the third compartment 83 from migrating to the fourth compartment 84. The upper baffle 214 also prevents the water from bypassing the basket 152 from above under normal flow conditions, when the water is below the predetermined level L3. A bypass flow opening 217 in the upper baffle 214 allows the water to bypass the media coalescer 30 under high flow conditions, when the water rises above the predetermined level L3.

Thus, the upper baffle 214, the lower baffle 210 and the non-porous frame 150 together constrain the water flowing through the cavity 47 from the front end 66 to the rear end 68 to flow through the top opening 161 into the basket 152 under normal flow conditions. Consequently, the upper baffle 214, the lower baffle 210 and the media coalecser 30 separate the third compartment 83 from the fourth compartment 84.

The manways 41, 42 and 43, shown in FIG. 2, are designated first, second and third manways 41, 42 and 43. They are spaced axially along the casing 14 and extend upward from the top 70 of the cavity 47. The manways 41, 42 and 43 provide access to the various compartments 81, 82, 83 and 84 for manually removing the floating and settled contaminants that are retained in those respective compartments 81, 82, 83 and 84. Specifically, the first manway 41 is located above the weir 120 for removing the contaminants retained in the first and second compartment 81 and 82. The second manway 42 is located above the third compartment 83 for removing the contaminants retained in the third compartment 83, and also for removing the baskets 152 and the coalescing media 154. The third manway 43 is located above the fourth compartment 84 for removing the contaminants retained in the fourth compartment 84.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. An apparatus comprising:
   a casing surrounding a horizontal axis to define a cavity having a top, a bottom, and axially front and rear ends, and configured to conduct a mixture of a liquid and debris through the cavity from the front end to the rear end;
   front and rear walls capping the casing at the front and rear ends;

a horizontal outlet tube extending through the rear wall and defining a horizontal outlet channel with a bottom; and a transversely-extending weir extending upward from the bottom of the cavity, the weir having a horizontal top edge spaced above the bottom of the outlet channel and below the top of the cavity, and further having fluid flow apertures spaced below the bottom of the outlet channel and arranged in horizontal mutually-overlapping rows, the apertures of one row being separated from each other and horizontally offset from the adjacent apertures of another row.

2. The apparatus of claim 1 wherein the weir is free of fluid flow apertures below a level halfway between the bottom of the cavity and the bottom of the outlet channel.

3. The apparatus of claim 1 further comprising a vertical outlet tube in the cavity, having an intake opening below the bottom of the horizontal outlet channel and defining a vertical outlet channel extending downward from the horizontal outlet channel to the intake opening.

4. The apparatus of claim 1 further comprising a horizontal inlet tube extending through the front wall, defining a horizontal inlet channel located above the bottom of the horizontal outlet channel.

5. The apparatus of claim 4 further comprising a vertical inlet tube in the cavity, having a discharge opening below the bottom of the horizontal outlet and defining a vertical inlet channel extending downward from the horizontal inlet channel to the discharge opening.

6. An apparatus comprising:

a casing surrounding a horizontal axis to define a cavity having a top, a bottom, and axially front and rear ends, and configured to conduct a mixture of a liquid and debris through the cavity from the front end to the rear end;

a horizontal outlet tube at the rear end for conducting the liquid out of the cavity and defining a horizontal outlet channel with a bottom; and a transversely-extending weir extending upward from the bottom of the cavity, and having a horizontal top edge spaced above the bottom of the outlet channel and below the top of the cavity, and further having fluid flow apertures below the bottom of the outlet channel, and being free of fluid flow apertures below a level halfway between the bottom of the cavity and the bottom of the outlet channel.

7. The apparatus of claim 6 wherein the weir is free of fluid flow apertures below a level halfway between the bottom of the cavity and the top edge of the weir.

8. The apparatus of claim 6 farther comprising an inlet tube at the front end for conducting the liquid and the debris into the cavity, and wherein the apertures are diametrically smaller than the inlet tube to filter out the debris that is larger than the apertures while passing the liquid.

9. The apparatus of claim 6 further comprising an opening in the casing configured to enable removal of debris that has been filtered out by the apertures and has settled to the bottom of the cavity in front of the weir.

10. An apparatus comprising:

a casing surrounding a horizontal axis to define a cavity having a top, a bottom, and axially front and rear ends, and configured to conduct a mixture of a liquid and debris through the cavity from the front end to the rear end;

an inlet tube at the front end for conducting the liquid and the debris into the cavity;

a horizontal outlet tube at the rear end for conducting the liquid out of the cavity and defining a horizontal outlet channel with a bottom; and a transversely-extending weir extending upward from the bottom of the cavity, and having a horizontal top edge spaced above the bottom of the outlet channel and below the top of the cavity, and further having fluid flow apertures that are below the bottom of the outlet channel and diametrically smaller than the inlet tube, whereby the apertures can filter out debris that may enter the cavity through the inlet tube.

11. The apparatus of claim 10 further comprising an opening in the casing configured to enable removal of any debris that may have been filtered out by the apertures and settled to the bottom of the cavity in front of the weir.

12. An apparatus comprising:

a casing surrounding a horizontal axis to define a cavity having a top, a bottom, and axially front and rear ends, and configured to conduct a mixture of a liquid and debris through the cavity from the front end to the rear end;

an inlet tube at the front end for conducting the liquid and the debris into the cavity;

a horizontal outlet tube at the rear end for conducting the liquid out of the cavity and defining a horizontal outlet channel with a bottom; and a transversely-extending weir extending upward from the bottom of the cavity, and having a horizontal top edge spaced above the bottom of the outlet channel and below the top of the cavity, and further having fluid flow apertures that are below the bottom of the outlet channel and sized to filter out debris that may enter the cavity through the inlet tube while passing the liquid.

13. The apparatus of claim 12 further comprising an opening in the casing configured to enable removal of debris that has been filtered out by the apertures and settled to the bottom of the cavity in front of the weir.

14. An apparatus comprising:

a casing surrounding a horizontal axis to define a cavity having a top, a bottom, and axially front and rear ends, and configured to conduct a mixture of a liquid and debris through the cavity from the front end to the rear end;

a horizontal outlet tube at the rear end for conducting the liquid out of the cavity and defining a horizontal outlet channel with a bottom;

a transversely-extending weir extending upward from the bottom of the cavity, and having a horizontal top edge spaced above the bottom of the outlet channel and below the top of the cavity, and further having fluid flow apertures below the bottom of the outlet channel for filtering out the debris while passing the liquid; and an access opening in the casing configured to enable removal of debris filtered out by the apertures and settled to the bottom of the cavity in front of the welt.

* * * * *